United States Patent
Hunt

[15] 3,671,513

[45] June 20, 1972

[54] CROSS-LINKED POLYOLEFIN COMPOSITION

[72] Inventor: George H. Hunt, West Newton, Mass.

[73] Assignee: Simplex Wire and Cable Company, North Berwick, Maine

[22] Filed: April 30, 1970

[21] Appl. No.: 33,515

Related U.S. Application Data

[63] Continuation-in-part of Ser. No. 764,651, Oct. 2, 1968, which is a continuation-in-part of Ser. No. 649,355, June 27, 1967, Pat. No. 3,445,394, which is a continuation of Ser. No. 367,718, May 15, 1964, abandoned.

[52] U.S. Cl. ...................260/93.7, 260/45.7 R, 260/80.7, 260/80.78, 260/94.9 GA
[51] Int. Cl. ................C08f 29/02, C08f 29/04, C08f 45/54
[58] Field of Search ...............260/94.9 GA, 45.7 R, 45.9 R, 260/878 R, 93.7, 80.7, 80.78

[56] References Cited

UNITED STATES PATENTS 3,542,684  11/1970  Hunt.....................260/63.2

Primary Examiner—Joseph L. Schofer
Assistant Examiner—William F. Hamrock
Attorney—John W. Behringer, Eugene L. Bernard, John Boustead, Martin J. Brown, James N. Dresser, John P. Floyd, Henry W. Foulds, Jr., Roger T. McLean, W. Brown Morton, Jr., John T. Roberts, John W. Routh, N. Dale Sayre, Malcolm L. Sutherland, J. Donald Tierney and McLean, Morton and Boustead

[57] ABSTRACT

A composition of polyolefin material suitable for production of cross-linked polyolefin dielectric products having high voltage stability is disclosed. High voltage stability is imparted to the polyolefin composition by the inclusion of any of a number of known substituted aromatic compounds and resistance to sag during cross-linking operation is provided by the inclusion of a polychlorinated biphenyl in an amount up to about 10 parts by weight per 100 parts of polyolefin.

4 Claims, No Drawings

CROSS-LINKED POLYOLEFIN COMPOSITION

RELATED CASES

This application is a continuation-in-part of application Ser. No. 764,651, filed by George H. Hunt Oct. 2, 1968, which is in turn a continuation-in-part of application Ser. No. 649,355, filed by George H. Hunt June 27, 1967, now U.S. Pat. No. 3,445,394, which is in turn a continuation of application Ser. No. 367,718, filed by George H. Hunt May 15, 1964, now abandoned. This application is related to application Ser. No. 714,461, filed by George H. Hunt and Jonathan R. Learn March 20, 1968.

BACKGROUND OF THE INVENTION

1. Field of the Invention

This invention relates to cross-linked polyolefin compositions and in particular to compositions having compounds which improve the voltage stability of such compositions.

2. Description of the Prior Art

Cross-linked polyolefin compositions and in particular cross-linked polyethylenes are well known, and conventionally are prepared by admixing with the polyolefin a cross-linking agent, typically organic peroxides such as di($\alpha$-cumyl) peroxide. The polyolefin is thereafter heat cured, i.e., vulcanized, to effect cross-linking, i.e., curing. The use of voltage stabilizing compounds in polyolefin compositions is now also well known. Such compounds typically are substituted aromatic compounds and are described in detail for example in Hunt U.S. Pat. No. 3,446,500, Gross et al. U.S. Pat. No. 3,350,312 and Lawrence J. Heidt patent application Ser. No. 732,486, filed May 7, 1968. The incorporation of such compounds is usually in an amount less than 1 part by weight per 100 parts by weight of polyolefin and produces, even in such small proportions, extraordinary improvement in the voltage stability of the polyolefin composition.

Such voltage stabilizing compounds, however, characteristically interfere with the rate of cure of polyolefin compositions when incorporating conventional peroxide type cross-linking catalysts, as is disclosed in the above noted copending application Ser. No. 714,461. The rate of cure of cross-linked polyolefins can be restored by the inclusion specifically of divinylbenzene which also has been found not to interfere with the voltage stabilizing activity of substituted aromatic compounds employed as voltage stabilizers. Typically 1 to 10 parts by weight of organic peroxide catalyst and 0.2 to 20 parts by weight of divinylbenzene are incorporated per 100 parts by weight of polyolefin and cures are effected in saturated steam at 275° to 450° F. or in liquid medium at 275° to 600° F. at a small positive pressure up to about 50 psig., normally about 20 to 30 psig.

A second problem discovered in connection with the production of cross-linked polyolefin compositions incorporating voltage stabilizing compounds is the occurrence of sag not experienced when the stabilizing compounds are omitted. The inclusion of a divinylbenzene, while it produces the desirable result of improving the rate of cure of voltage stabilized polyolefin compositions does not seem to show any corrective effect on sag particularly in the manufacture of heavy walled, cross-linked, voltage stabilized polyolefin insulated cable, surprisingly, since divinylbenzene increases the hot modulus of cured insulation. This is thought to occur because divinylbenzene acts as a softener for the polyolefin composition and permits the polyolefin composition to flow rapidly before cure commences.

SUMMARY OF THE INVENTION

It has now been found that cross-linked voltage stabilized polyolefin compositions cured by means of heat and through the use of a peroxide catalyst can be improved, particularly with respect to the sagging problem, by incorporating polychlorinated biphenyls in the polyolefin composition which is to be cross-linked, typically in an amount of about 1 part to 10 parts by weight per 100 parts by weight of polyolefin.

As indicated in the parent applications, for example, U.S. Pat. No. 3,445,394, averred to above, it has been the practice for several reasons to include an aromatic oil in preparing voltage stabilized polyolefin compositions. Such aromatic oil functions not only as a vehicle for incorporating the voltage stabilizing compounds, but also has been found to exhibit a synergistic effect permitting achievement of even greater voltage stability than is obtainable by its use alone or by the use of the voltage stabilizing additives alone. Such oils probably are the cause of the sag problem in production of cross-linked voltage stabilized polyolefin compositions. Thus, in accordance with this invention resistance to sagging during cure of cross-linked voltage stabilized polyolefin compositions is achieved by substituting polychlorinated biphenyls for aromatic oils normally included with the voltage stabilizing compounds. That such a substitution of one oil for another, which is a well known plasticizer, should have a corrective effect on sag could not have been anticipated. The degree of chlorination of the biphenyls is in the range from about 10 to about 60 percent by weight as in this range the polychlorinated biphenyls are liquid at temperatures at which they can be compounded with the polyolefin. Preferably they are highly chlorinated and are in the range of 40 to 60 percent as the volatility of the materials is an inverse function of degree of chlorination.

DETAILED DESCRIPTION

Although the following examples of this invention are limited to the employment of low density polyethylenes the invention is generally applicable to the cross-linking of polyolefins such as low density and high density polyethylene, the polypropylenes and ethylenepropylene rubber.

The compositions of this invention are produced using conventional mixing and blending techniques. Thus, for example, a granular polyolefin-organic peroxide mixture is prepared by blending in a hot mill. Such mixture is in fact commercially available in pre-mixed form. The divinylbenzene, when used, is added at room temperature in a conventional mixer. Preferably the voltage stabilizing compound, i.e., substituted aromatic compound, is first blended with the polychlorinated biphenyl by tumbling or the like and is then added to the polyolefin composition either at the same time, before or after the divinylbenzene. Oxidation inhibitors, adjuvants and fillers such as carbon black, silica, alumina, calcium silicate and clay can also be added in a conventional manner. Master batch techniques can be used where desirable in mixing the ingredients.

EXAMPLES I—V

A series of five compositions of a low density polyethylene were prepared. For comparative purposes two different aromatic oils were used and a divinylbenzene was used in certain occasions as a cure modifier. The compositions were tested for dimensional stability during cure by preparing strip samples 4.9 inches in length which were suspended in an oven at curing temperature (390°, to 400° F.) for 15 minutes. All of the compositions were so sampled and cured simultaneously and the length of the samples was measured. The following Table I sets forth the formulations and measured final length. Example I is of cross-linked polyethylene with no voltage stabilizer; Examples II and III are of cross-linked, voltage stabilized polyethylene without benefit of this invention; while Examples IV and V are of cross-linked, voltage stabilized polyethylene in accordance with this invention.

TABLE I

| Example No. | I | II | III | IV | V |
|---|---|---|---|---|---|
| Formulation, parts by weight: | | | | | |
| Polyethylene [1] | 100 | 100 | 100 | 100 | 100 |
| Aromatic hydrocarbon oil: | | | | | |
| Oil A [2] | | 2.0 | | | |
| Oil B [3] | | | 2.0 | | |

TABLE I

| Example No. | I | II | III | IV | V |
|---|---|---|---|---|---|
| Polychlorinated biphenyls [4] | | | | 2.0 | 2.0 |
| Voltage stabilizing compound: | | | | | |
|   Polychlorinated biphenyls [5] | | 0.5 | | | |
|   Diphenylamine | | | 0.25 | 0.40 | 0.40 |
|   2,4-dinitrotoluene | | | 0.25 | 0.10 | 0.10 |
| Divinylbenzene [6] | | | 2.0 | | 2.0 |
| Sag test: | | | | | |
|   Average length, inches | 5.7 | 10.4 | 11.7 | 6.3 | 8.7 |
|   Number of replicate samples | 10 | 4 | 4 | 6 | 8 |

[1] HFDB—a low density polyethylene containing 2-3 parts di($\alpha$-cumyl) peroxide.
[2] Kensol Ph 4, aromatic content 65%.
[3] CD-101, aromatic content 65%.
[4] 48% Cl, by weight.
[5] 60% Cl, by weight.
[6] Contains trace of commercial antioxidant.

The following series of Examples VI–XI set forth in Table II makes a similar comparison of a commercial cross-linked polyethylene composition (Example VI), cross-linked voltage stabilized polyethylene composition without the benefit of this invention (Examples VII, VIII and XI), and cross-linked voltage stabilized composition in accordance with this invention (Examples IX and X). In these examples the electrical properties and mechanical properties are evaluated.

I claim:

1. A composition suitable for heat curing to produce a cross-linked voltage stabilized polyolefin composition which comprises a polyolefin base selected from the group consisting of low density polyethylenes, high density polyethylenes, polypropylenes and ethylenepropylene rubbers, from 1 to 10 percent by weight of a peroxide catalyst, a voltage stabilizer for said polyolefin in an amount effective to impart voltage stability to the polyolefin composition after heat curing, and up to 10 parts by weight of polychlorinated biphenyl per 100 parts by weight of polyolefin base, the degree of chlorination of said polychlorinated biphenyl being in the range from about 10 to about 60 percent by weight.

2. A cross-linked voltage stabilized polyolefin composition produced by heat curing a composition according to claim 1.

3. A method for producing a cross-linked voltage stabilized polyolefin composition which is produced by heat curing a composition according to claim 1.

4. A composition according to claim 1 in which the degree of chlorination of said polychlorinated biphenyl is in the range of 40 to 60 percent by weight.

* * * * *

TABLE II

| Example No. | VI | VII | VIII | IX | X | XI |
|---|---|---|---|---|---|---|
| Formulation, parts by weight: | | | | | | |
|   Polyethylene [1] | 100 | 100 | 100 | 100 | 100 | 100 |
|   Aromatic hydrocarbon Oil B | | 2 | 2 | | | 2 |
|   Polychlorinated biphenyls [2] | 2 | | | 2 | 2 | |
|   Voltage stabilizing compound: | | | | | | |
|     Diphenylamine | .25 | .25 | .4 | .4 | .75 | .75 |
|     2,4-dinitrotoluene | .25 | .25 | .1 | .1 | | |
|     Divinylbenzene [3] | 2 | 2 | 2 | 2 | 2 | 2 |
| Needle test [4], failures in eight replicates: 50 kv | 0 | 6 | 2 | 1 | 0 | 3 |
| Hot modulus at 100% elongation, pounds per square inch at 250° F., cured at 350° F.: | | | | | | |
|   2.5 minutes | 31.7 | 21.2 | 25.5 | 26.1 | 33.5 | 18.6 |
|   5 minutes | 40.0 | 36.4 | 31.8 | 42.7 | 38.8 | 32.5 |
|   10 minutes | 45.8 | 38.6 | 35.8 | 45.6 | 68.2 | 42.0 |
| Hot modulus, cured at 350° F., unaged: | | | | | | |
|   Tensile | 1,615 | 1,560 | 1,745 | 1,600 | 1,695 | 1,815 |
|   Elongation | 363 | 370 | 400 | 355 | 388 | 438 |
| Hot modulus, cured at 150° C., aged 7 days: | | | | | | |
|   Tensile | 1,575 | 1,480 | 2,010 | 2,045 | 2,235 | 2,220 |
|     Percent retained | 98 | 95 | 116 | 118 | 132 | 122 |
|   Elongation | 337 | 350 | 437 | 425 | 462 | 475 |
|     Percent retained | 93 | 95 | 109 | 119 | 119 | 108 |

[1] HFDB—a low density polyethylene containing 2-3 parts di($\alpha$-cumyl) peroxide.
[2] 32% Cl, by weight.
[3] Contains trace of commercial antioxidant.
[4] Single needle test, see "An Accelerated Screening Test For Polyethylene High Voltage Insulation," AIEE Transaction Paper No. 62-54 (1962), D. W. Kitchin and O. S. Pratt.